United States Patent [19]

Shirako

[11] Patent Number: 4,563,718
[45] Date of Patent: * Jan. 7, 1986

[54] TAPE CASSETTE LINER

[75] Inventor: Hideo Shirako, Tokyo, Japan

[73] Assignee: Olympus Optical Co., Ltd., Tokyo, Japan

[ * ] Notice: The portion of the term of this patent subsequent to May 7, 2002 has been disclaimed.

[21] Appl. No.: 461,208

[22] Filed: Jan. 26, 1983

[30] Foreign Application Priority Data

Feb. 4, 1982 [JP] Japan .............................. 57-14300[U]

[51] Int. Cl.$^4$ ...................... G11B 23/02; G11B 15/32; G03B 1/04
[52] U.S. Cl. ..................................... 360/132; 242/199
[58] Field of Search ................ 360/132; 242/197, 199, 242/200

[56] References Cited

U.S. PATENT DOCUMENTS

| | | | |
|---|---|---|---|
| 3,675,875 | 7/1972 | Schmidt | 242/199 |
| 4,102,515 | 7/1978 | Milants | 242/199 |
| 4,127,242 | 11/1978 | Hashimoto et al. | 242/199 |
| 4,289,285 | 9/1981 | Ishida et al. | 242/199 |
| 4,466,036 | 8/1984 | Ishida et al. | 360/132 |

FOREIGN PATENT DOCUMENTS 2016413 9/1979 United Kingdom ................ 360/132

Primary Examiner—Stuart N. Hecker
Assistant Examiner—Benjamin Urcia
Attorney, Agent, or Firm—Frishauf, Holtz, Goodman & Woodward

[57] ABSTRACT

A tape cassette has a pair of cassette halves coupled with each other to form a housing. Each cassette half has a plurality of projections protruding toward the other cassette half. A pair of reel hubs and a magnetic tape wound around the reel hubs are housed in the housing. A pair of liner sheets are arranged individually between the cassette halves and the magnetic tape to hold the magnetic tape elastically on both sides, thereby preventing irregular winding of the magnetic tape. Each liner sheet has a plurality of first protrusions protruding toward each opposite cassette half from those portions of the liner sheet which correspond to the projections of the opposite cassette half and elastically abutting against their corresponding projections. Further, each liner sheet has a plurality of second protrusions protruding toward and elastically abutting against the magnetic tape.

17 Claims, 5 Drawing Figures

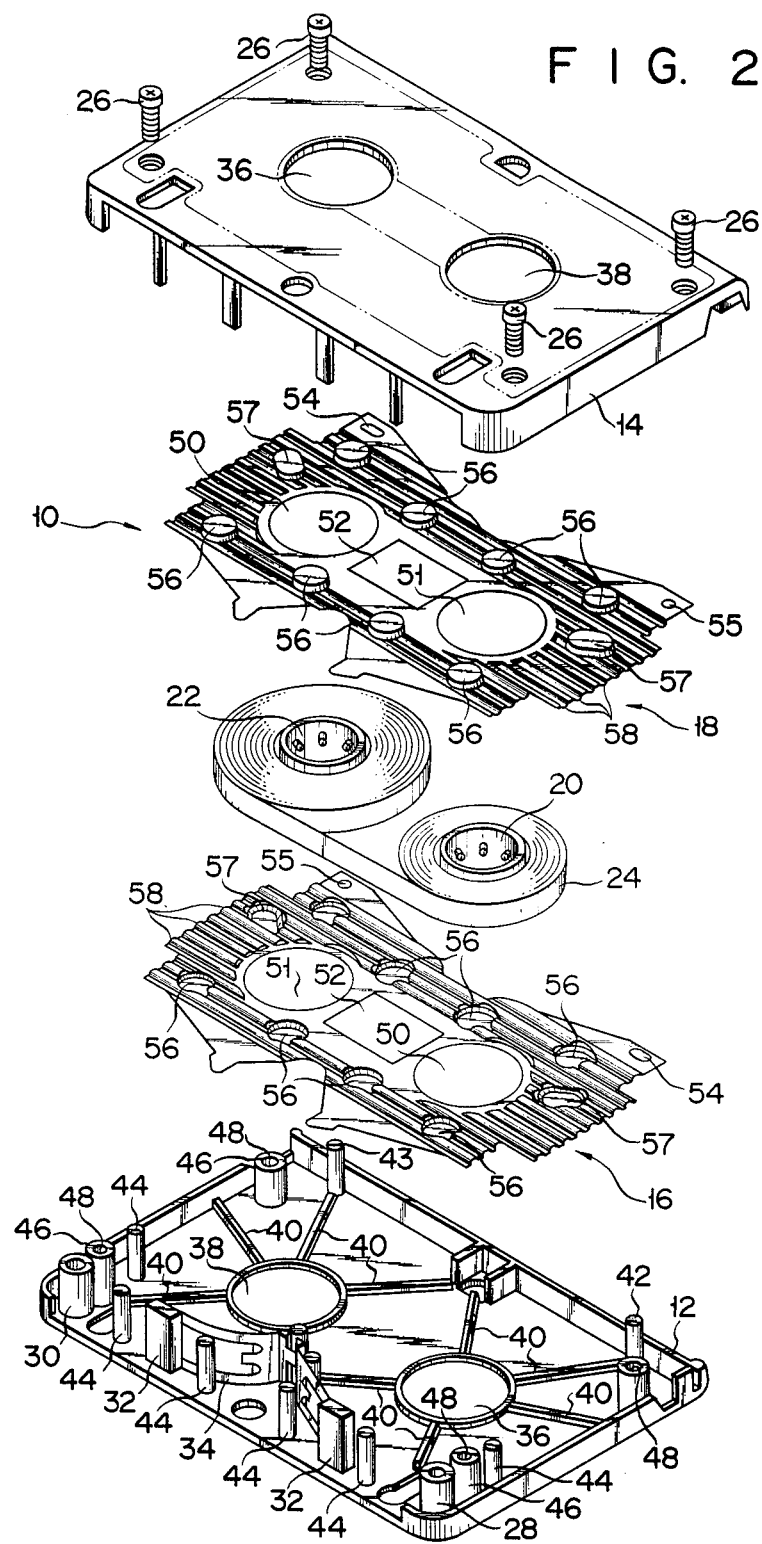

TAPE CASSETTE LINER

BACKGROUND OF THE INVENTION

This invention relates to tape cassettes, such as compact cassettes, micro cassettes, video cassettes, etc., housing a magnetic tape, reel hubs, etc.

A tape cassette generally comprises a pair of cassette halves coupled with each other to form a housing, and a magnetic tape wound around a pair of reel hubs and contained in the housing. Also, the tape cassette has a pair of elastic liner sheets arranged individually between their corresponding cassette halves and the magnetic tape. Thus, the magnetic tape is vertically held between the liner sheets to prevent it from being wound irregularly. For more secure prevention of the irregular winding of the magnetic tape, there has recently been provided a tape cassette in which a plurality of projections are formed on the facing surfaces of the cassette halves, and the liner sheets are interposed individually between the projections and the magnetic tape. According to this tape cassette, the liner sheets are liable to move less along the thickness of the cassette due to the existence of the projections. Thus, the magnetic tape and reel hubs can be sustained in the central portion of the cassette along its thickness, so that irregular winding of the magnetic tape can be prevented. With this cassette, however, once irregular winding of the magnetic tape is caused so that the liner sheets are pressed by the magnetic tape, the liner sheets engage the projections to be trapped thereby, and lose their elasticity. As a result, the frictional resistance between the magnetic tape and the liner sheets increases, which varies the traveling speed of the magnetic tape.

SUMMARY OF THE INVENTION

This invention was created in consideration of these circumstances, and is intended to provide a tape cassette capable of securely preventing the irregular winding of a magnetic tape, and of reducing the frictional resistance between the magnetic tape and liner sheets even in case of irregular winding.

According to one aspect of the invention, there is provided a tape cassette which comprises a pair of cassette halves coupled with each other to form a housing, each of the cassette halves having an inner surface facing the inner surface of the other cassette half, a plurality of projections formed on the inner surface, and a pair of reel shaft insertion holes; a pair of reel hubs rotatably housed in the housing; a magnetic tape housed in the housing and wound around the reel hubs; and a pair of liner sheets arranged individually between the cassette halves and the magnetic tape to hold the magnetic tape elastically on both sides, thereby preventing irregular winding of the magnetic tape. Each of the liner sheets has a plurality of first protrusions protruding toward each opposite cassette half from those portions of the liner sheet which correspond to the projections of the opposite cassette half and elastically abutting against their corresponding projections, and a plurality of second protrusions protruding toward the magnetic tape and elastically abutting against the magnetic tape. According to this tape cassette, the liner sheets have their respective protrusions protruding in opposite directions, so that the magnetic tape can be held in the central portion of the cassette along its thickness, and can be securely prevented from being wound irregularly. Since only the second protrusions of the liner sheets abut against the magnetic tape, the contact area between the liner sheets and the magnetic tape is small. The frictional resistance can be prevented from increasing by elastic deformation of the first and second protrusions even in case of irregular winding of the magnetic tape. Thus, the stable traveling of the magnetic tape can be maintained.

BRIEF DESCRIPTION OF THE DRAWINGS

FIGS. 1 to 4 snow a tape cassette according to one embodiment of this invention, in which FIG. 1 is a perspective view of the tape cassette, FIG. 2 is a disassembled perspective view of the tape cassette, FIG. 3 is a plan view showing one cassette half provided with a liner sheet, and FIG. 4 is a schematic sectional view taken along line IV—IV of FIG. 3.

DETAILED DESCRIPTION OF THE PREFERRED EMBODIMENT

Figure 1:
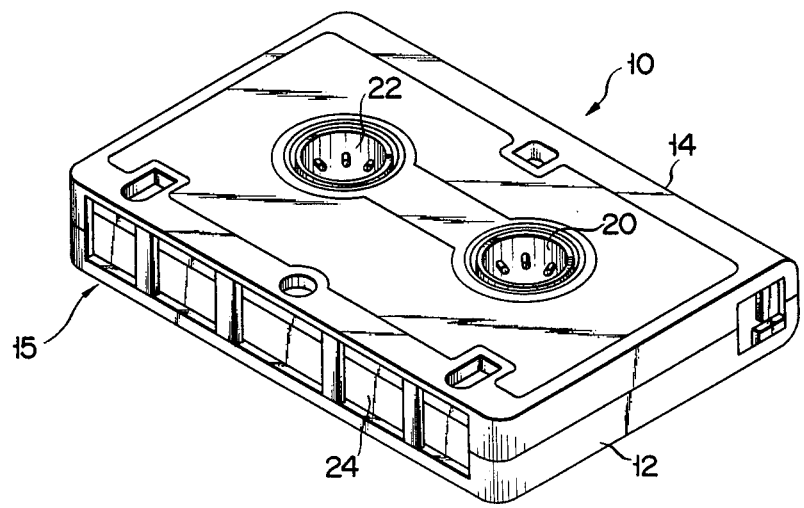

As shown in FIGS. 1 and 2, a micro cassette 10 comprises a pair of cassette halves 12 and 14, a pair of liner sheets 16 and 18, a pair of reel hubs 20 and 22, and a magnetic tape 24 wound around the reel hubs 20 and 22. The liner sheet 16 is interposed between the cassette half 12 and the magnetic tape 24, while the liner sheet 18 is interposed between the cassette half 14 and the magnetic tape 24. The cassette halves 12 and 14 are coupled with each other by means of screws 26 to form a housing 15, in which the liner sheets 16 and 18, the reel hubs 20 and 22, and the magnetic tape 24 are contained. The micro cassette 10 also comprises a pair of guide rollers 28 and 30, and a pad spring 34 provided with a pair of pads 32. These members are also contained in the housing 15.

Figure 3:
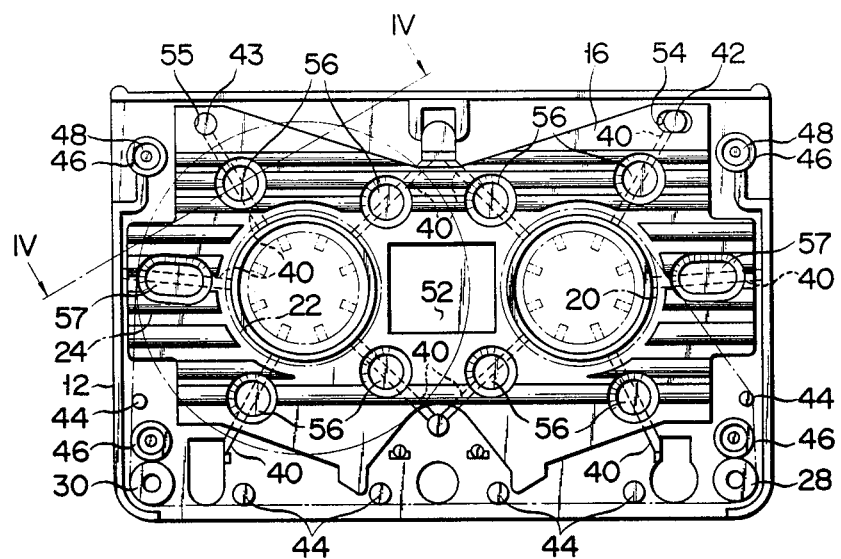

As shown in FIGS. 2 and 3, the cassette half 12 has an inner surface 35 facing that of the cassette half 14, and a pair of circular reel shaft insertion holes 36 and 38. Also, the cassette half 12 has ten rib-shaped projections 40 protruding toward the other cassette half 14 from the inner surface 35 thereof. The rib-shaped projections 40 extend radially from the outer peripheral edges of the reel shaft insertion holes 36 and 38. Each five of the rib-shaped projections 40 are arranged at intervals along the circumference of their corresponding reel shaft insertion hole 36 or 38. Moreover, the cassette half 12 has a pair of positioning pins 42 and 43 spaced and protruding from the upper end portion of the inner surface 35, and a plurality of guide pins 44 protruding from the lower end portion of the inner surface. Column sections 46 are erected on the four corners of the cassette half 12, and screw holes 48 for mating the cassette halves 12 and 14 are formed individually in the column sections 46. The guide rollers 28 and 30 are rotatably attached to the lower right and left end portions, respectively, of the cassette half 12. The other cassette half 14 forms a substantially symmetrical configuration with the cassette half 12, having reel shaft insertion holes 36 and 38 and rib-shaped projections (not shown) formed on an inner surface thereof which faces the inner surface 35 of the cassette half 12. In this embodiment, the cassette halves 12 and 14 are formed of transparent plastic.

The liner sheet 16 has a pair of circular holes 50 and 51 corresponding to the reel shaft insertion holes 36 and 38, respectively, of the cassette half 12. Also, the liner sheet 16 has a window opening 52 formed between the holes 50 and 51, and holes 54 and 55 capable of engaging the positioning pins 42 and 43, respectively, of the cassette half 12. The liner sheet 16 is further provided with eight protrusions 56 with a circular cross section and two additional protrusions 57 with an elliptical cross section arranged around the individual holes 50 and 51 at spaces along the circumferences of the holes 50 and 51. The protrusions 56 and 57 are formed by embossing so as to protrude from the liner sheet 16 toward the cassette half 12. The diameter of the protrusions 56 and the width of the protrusions 57 are greater than the width of the rib-shaped projections 40. As seen from FIG. 3, the protrusions 56 and 57 are so designed as to be located individually on the rib-shaped projections 40 when the liner sheet 16 is attached to the cassette half 12. Thus, the protrusions 56 and 57 elastically abut against the projections 40. Preferably, the centers of the protrusions 56 and 57 are located on their corresponding projections 40, as shown in FIG. 3. The major axis of each of the protrusions 57 is at a given angle to a segment connecting the centers of the holes 50 and 51. The protrusions 56 and 57 constitute first protrusions of this invention.

The liner sheet 16 also has a plurality of second protrusions 58 protruding toward the magnetic tape 24. Each protrusion 58 is formed in the shape of a rib by embossing, extending parallel to the segment connecting the centers of the holes 50 and 51. Arranged at regular intervals, the protrusions 58 can elastically abut against the magnetic tape 24. Each protrusion 58 has a substantially semicircular cross section so that it can be in liner contact with the magnetic tape 24. The protrusions 58 are not formed around the holes 50 and 51 of the liner sheet 16, i.e., at those portions of the liner sheet 16 which abut against the reel hubs 20 and 22, at the upper edge portion of the liner sheet 16 which surrounds the positioning holes 54 and 55, and at the lower edge portion of the liner sheet 16 which abuts against the pad spring 34. That is, those portions are flat.

The other liner sheet 18 forms a symmetrical configuration with the liner sheet 16, and has protrusions 56, 57 and 58. The protrusions 56 and 57 protrude toward the cassette half 14, while the protrusions 58 protrude toward the magnetic tape 24.

Figure 4:
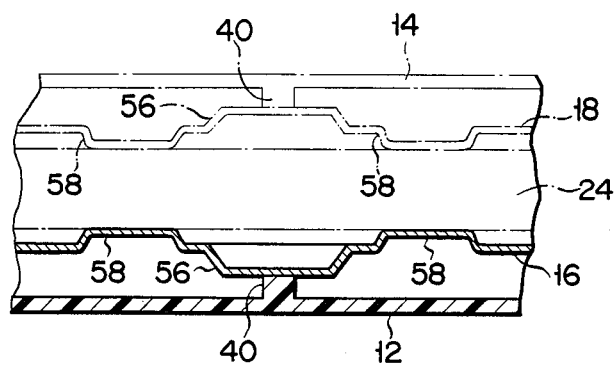

FIG. 3 shows a state in which the cassette half 12 is mounted with the liner sheet 16, the reel hubs 20 and 22, and the magnetic tape 24. The liner sheet 16 is set in position relative to the cassette half 12 with the holes 54 and 55 engaged with the positioning pins 42 and 43, respectively, of the cassette half 12. The hole 54 is elongated horizontally so that the liner sheet 16 can bend. The protrusions 56 are in elastic contact with the rib-shaped projections 40. The reel hubs 20 and 22 are rotatably fitted in the reel shaft insertion holes 36 and 38, respectively. The magnetic tape 24 is passed around the guide pin 44 and the guide rollers 28 and 30 to be guided thereby in traveling. The other cassette half 14 fitted with the liner sheet 18 is attached to the cassette half 12 by means of the screws 26 so that the magnetic tape 24 is vertically and elastically held between the liner sheets 16 and 18, as shown in FIG. 4. The liner sheets 16 and 18 have their respective protrusions 56 protruding toward the cassette halves 12 and 14, respectively, and elastically abutting against the projections 40 protruding from the cassette halves 12 and 14 toward the magnetic tape 24. Thus, the liner sheets 16 and 18 adjoin the magnetic tape 24 so that the magnetic tape 24 is sustained in the central portion of the cassette 10 along its thickness. Also, the liner sheets 16 and 18 have their respective second protrusions 58 protruding toward the magnetic tape 24 and elastically abutting against the same. Accordingly, the magnetic tape 24 can be held more securely in the central portion of the cassette 10 along its thickness. Thus, the liner sheets 16 and 18 can securely prevent the magnetic tape 24 from being wound irregularly. Since the protrusions 56 and 57 are located on the projections 40, the liner sheets 16 and 18 can entirely adjoin the magnetic tape 24 even if the protrusions 56 and 57 are short. Therefore, the protrusions 56 and 57, along with the protrusions 58, need not be made high, so that the liner sheets 16 and 18 will not be significantly distorted by the formation of the protrusions thereon.

If the magnetic tape 24 undergoes stepped winding or other irregular winding, and so presses on the liner sheets 16 and 18, then the liner sheets 16 and 18 will move against the pressure through elastic deformation of the first protrusions 56 and 57 and the second protrusions 58. Since the diameter and width of the protrusions 56 and 57 are greater than the width of the projections 40, the protrusions 56 and 57 can easily undergo elastic deformation in any direction. Even in the case of irregular winding of the magnetic tape 24, the frictional resistance between the magnetic tape 24 and the liner sheets 16 and 18 will not increase, so that the traveling speed of the magnetic tape 24 will hardly vary. Moreover, each of the liner sheets 16 and 18 has a number of bar-shaped protrusions 58, which are in linear contact with the magnetic tape 24. Thus, the frictional resistance between the magnetic tape 24 and the liner sheets 16 and 18 is reduced.

As described before, each of the protrusions 57 is located at an angle to the segment connecting the centers of the holes 50 and 51 of each liner sheet. Moreover, the feeding portion of the magnetic tape 24 always passes between its corresponding protrusions 57 while the magnetic tape 24 travels from the reel hub 20 or 22 to its corresponding guide pin 44. Furthermore, those projections 40 which are in contact with the protrusions 57 are a little higher than the other projections. Accordingly, the feeding portion of the magnetic tape 24 is securely positioned by the liner sheets 16 and 18, so that the magnetic tape 24 is stably fed out. Likewise, the take-up portion of the magnetic tape 24 passes between its corresponding protrusions 57, and is securely positioned by the liner sheets 16 and 18.

Thus, according to the micro cassette 10 of the invention, the liner sheets 16 and 18 have elasticity and flexibility, so that the magnetic tape 24 can enjoy stable traveling without irregular winding.

Figure 5:
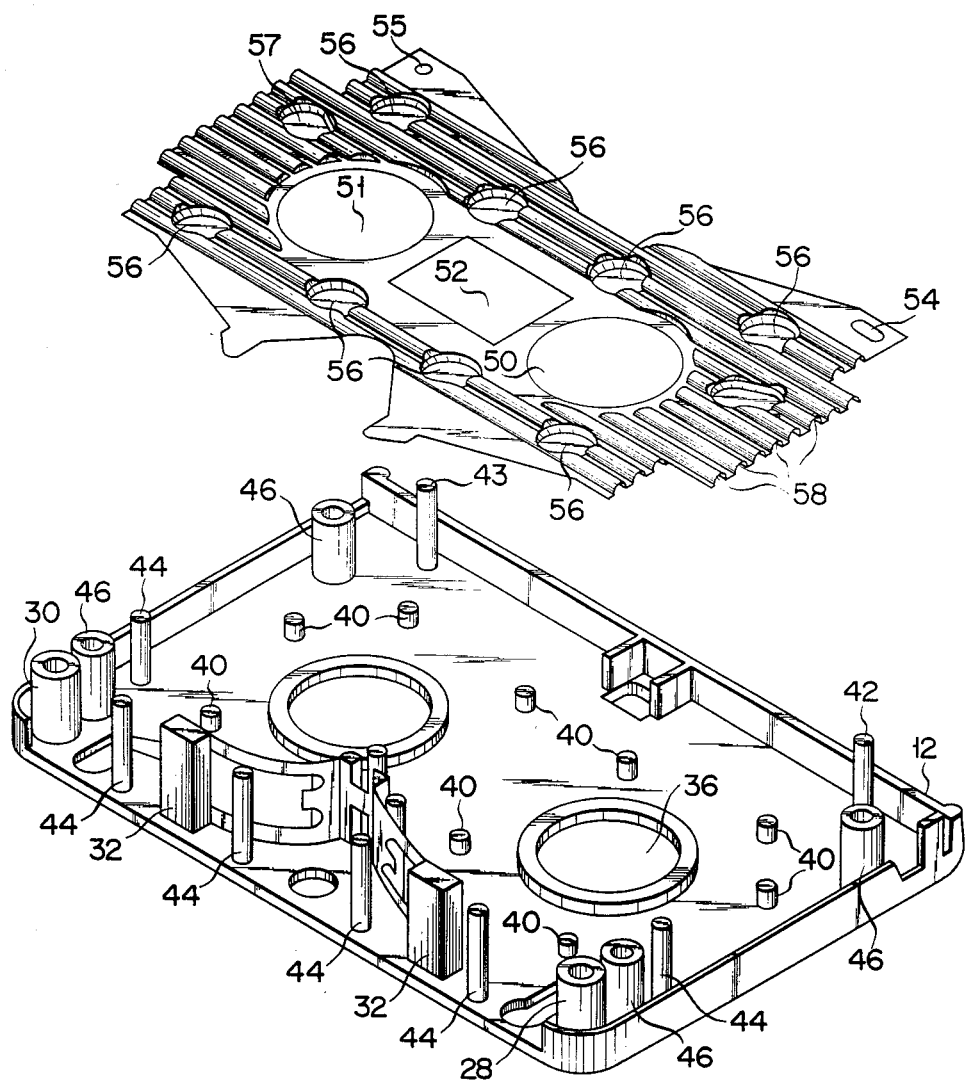
FIG. 5 is a disassembled perspective view showing a modification of the tape cassette of the invention.

In the embodiment described above, the projections 40 of the cassette halves are in the form of ribs extending radially from the outer peripheral edges of the reel shaft insertion holes 36 and 38. As shown in FIG. 5, however, columnar projections may be used for the projections 40 with the same effect. These projections 40 are spaced and arranged along the circumferences of the reel shaft insertion holes 36 and 38. The projections 40 are so arranged as to abut against the respective centers of their corresponding protrusions 56 and 57 when the liner sheet 16 is attached to the cassette half 12. The diameter of each projection 40 is shorter than that of each protrusion 56.

This invention is not limited to a micro cassette, and may also be applied to a compact cassette, video cassette, etc. It is to be understood, moreover, that the projections of the cassette halves and the first and second protrusions of the liner sheets may be changed in shape and number as required.

What is claimed is:

1. A tape cassette comprising:
   a pair of cassette halves coupled with each other to form a housing, each cassette half having an inner surface facing the inner surface of the other cassette half, a plurality of projections formed on the inner surface, and a pair of reel shaft insertion holes;
   a pair of reel hubs rotatably housed in the housing;
   a magnetic tape housed in the housing and wound around the reel hubs; and
   a pair of liner sheets arranged individually between the cassette halves and the magnetic tape to hold the magnetic tape elastically on both sides, thereby preventing irregular winding of the magnetic tape, each liner sheet having a plurality of first protrusions protruding toward each opposite cassette half from those portions of the liner sheet which correspond to the projections of the opposite cassette half and elastically abutting against their corresponding projections, and a plurality of second protrusions protruding toward the magnetic tape and elastically abutting against the magnetic tape.

2. The tape cassette according to claim 1, wherein said projections of the cassette half are spaced and arranged along the circumferences of the reel shaft insertion holes of the cassette half.

3. The tape cassette according to claim 2, wherein each of said liner sheets has a pair of holes corresponding to the reel shaft insertion holes of the cassette halves, and the first protrusions are spaced and arranged along the circumferences of the holes.

4. The tape cassette according to claim 3, wherein said projections of the cassette halves are ribs extending radially from each reel shaft insertion hole.

5. The tape cassette according to claim 3, wherein said projections of the cassette halves are columnar.

6. The tape cassette according to claim 5, wherein each of said first protrusions has a circular cross section whose center is located on the corresponding projection of the cassette half, the diameter of each first protrusion being greater than that of the corresponding projection.

7. The tape cassette according to claim 4, wherein each of said first protrusions has a circular cross section whose center is located on the corresponding projection of the cassette half, the diameter of each first protrusion being greater than the width of the corresponding projection.

8. The tape cassette according to claim 7, wherein said second protrusions are ribs arranged at intervals.

9. The tape cassette according to claim 8, wherein each of said second protrusions has a substantially semi-circular cross section to be in linear contact with the magnetic tape.

10. The tape cassette according to claim 9, wherein each of said liner sheets has a pair of holes corresponding to the reel shaft insertion holes of the cassette halves, and each second protrusion is located parallel to a segment connecting the centers of the holes of the liner sheet.

11. The tape cassette according to claim 4, wherein some of said first protrusions are circular in cross section, the center of each of which is located on the corresponding projection of the cassette half and the diameter of each of which is greater than the width of the corresponding projection; and the rest of said first protrusions are substantially elliptical in cross section and are located over the paths of the feeding and take-up portions of the magnetic tape, respectively.

12. The tape cassette according to claim 4, wherein said ribs are straight.

13. The tape cassette according to claim 8, wherein said ribs of said second protrusions are straight ribs.

14. The tape cassette according to claim 13, wherein said ribs extend transversely of the respective liner sheets in the direction of running of the tape.

15. The tape cassette according to claim 3, wherein said second protrusions are ribs arranged at intervals.

16. The tape cassette according to claim 15, wherein said liner sheets do not have said second protrusions formed therein at portions of said liner sheet adjacent said holes therein.

17. The tape cassette according to claim 1, wherein said liner sheets do not have said second protrusions formed therein at portions of said liner sheet adjacent said reel shaft insertion holes.

* * * * *

UNITED STATES PATENT AND TRADEMARK OFFICE
CERTIFICATE OF CORRECTION

PATENT NO. : 4,563,718
DATED : January 7, 1986
INVENTOR(S) : Hideo SHIRAKO

It is certified that error appears in the above-identified patent and that said Letters Patent is hereby corrected as shown below:

Column 6 (claim 8), line 9, change "claim 7" to

--claim 1--.

Signed and Sealed this

Eighth Day of July 1986

[SEAL]

Attest:

DONALD J. QUIGG

Attesting Officer

Commissioner of Patents and Trademarks